INVENTORS
MARTIN R. BATES
JOHANNES W. PRAST
WILLIAM V. SCOTT
BY
Alexander & Dowell
ATTORNEYS

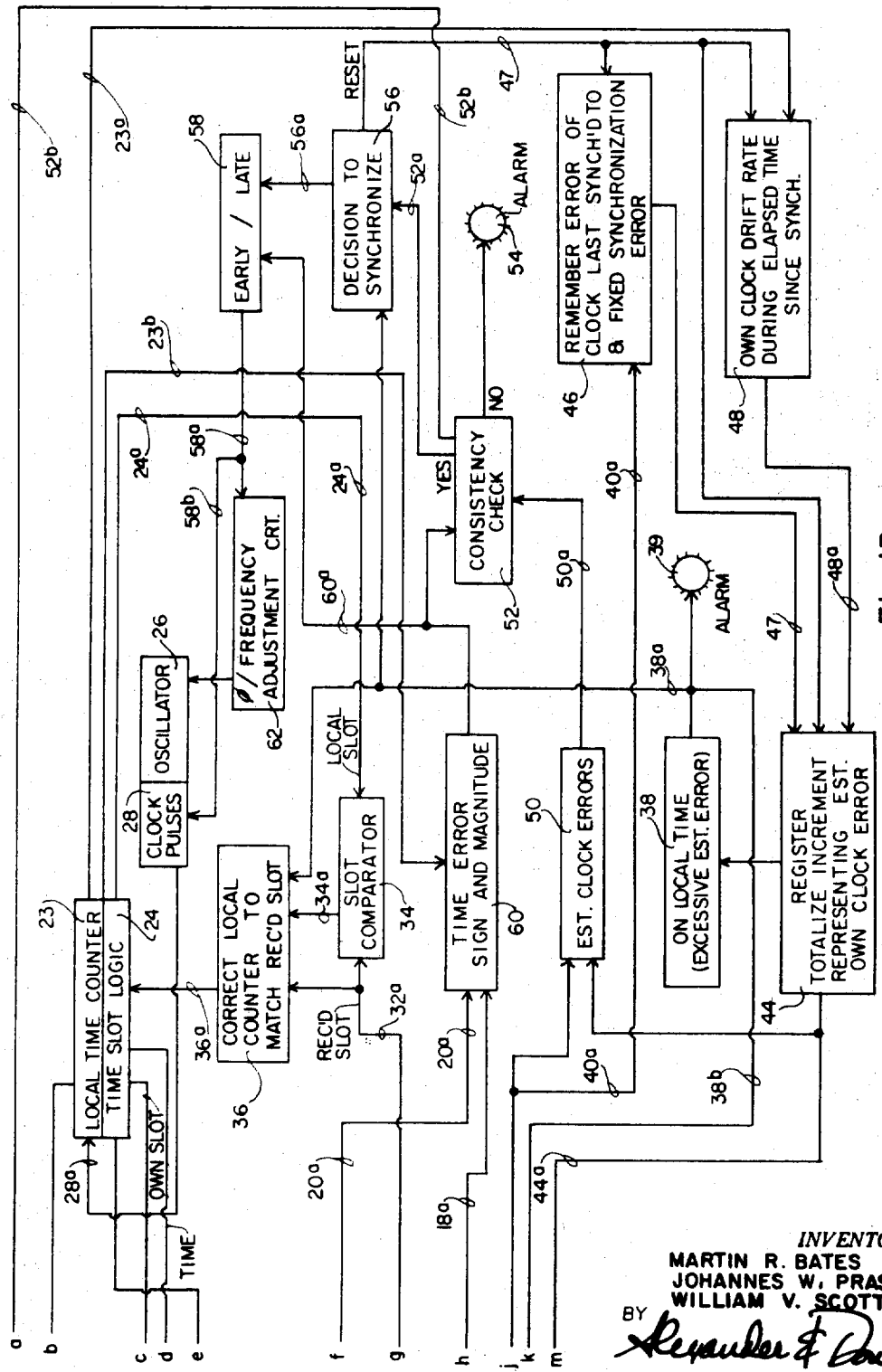
Fig. IB

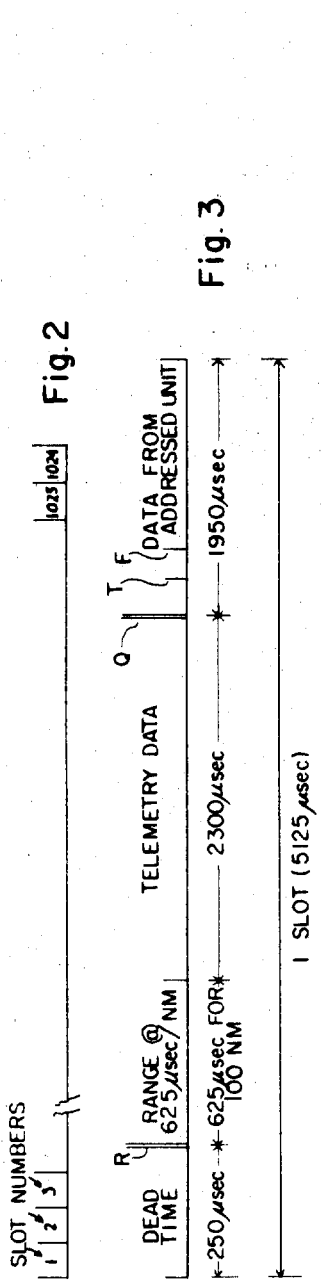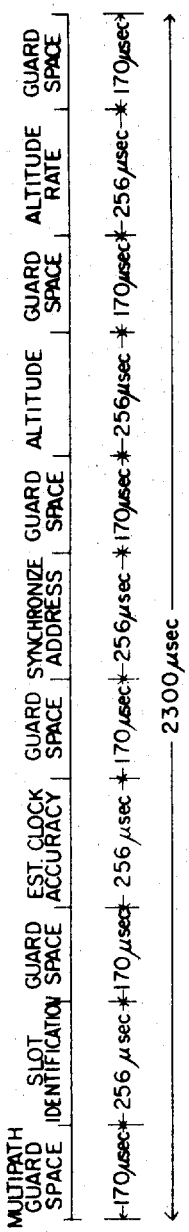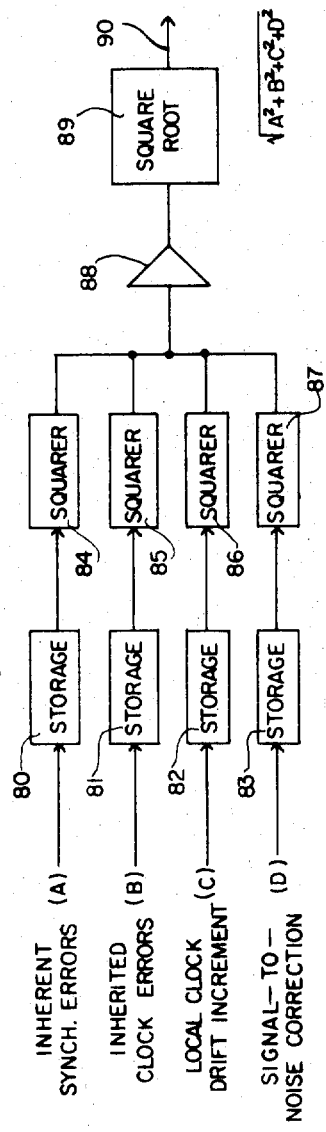

3,440,652
Patented Apr. 22, 1969

3,440,652
HIERARCHY CLOCK SYNCHRONIZATION
Martin R. Bates, Kenmore, Johannes W. Prast, Grand Island, and William V. Scott, Depew, N.Y., assignors to Sierra Research Corporation, a corporation of New York
Filed Oct. 2, 1967, Ser. No. 672,357
Int. Cl. G01s 9/52
U.S. Cl. 343—7.5                                18 Claims

ABSTRACT OF THE DISCLOSURE

An aircraft navigation and collision avoidance system of the type using accurately synchronized time clocks in the various aircraft units, wherein each local aircraft estimates the probable error of its time clock and telemeters this estimate to other aircraft within radio range, and wherein the local aircraft receives from other aircraft the estimates of their local time clock errors. Each aircraft compares its own estimated error with those of other aircraft, and resynchronizes its clock to match the clock in another aircraft which appears to be higher in the synchronization hierarchy by virtue of estimating a smaller local error, whereby the clocks in the various aircraft tend to approach closer synchronization not only with each other, but operate in a system which provides means whereby a suitably equipped aircraft entering a synchronized hierarchy with no initial synchronism whatever can become synchronized therewith. The system includes means for accomplishing coarse and fine synchronization of local time clocks, for estimating local clock errors, for telemetering information between aircraft, and for exchanging pulses for the purpose of measuring ranges between aircraft both for navigational purposes and for purposes of determining signal transit times incident to determining mutual clock errors. The system employs such refinements as consistency checking means, alarms to warn of excessive local clock errors, circuits for selecting another aircraft having a better synchronized clock, and means for breaking a tie between several well-synchronized aircraft.

This invention relates to time-division mobile-unit navigation and collision avoidance systems employing accurate time clocks in the units involved, which clocks are all synchronized with varying degrees of accuracy to a standardized time with which at least some fixed ground stations are precisely synchronized. More particularly, the invention relates to systems for selectively communicating the time between imperfectly synchronized units to assume the greater degree of accuracy of those better synchronized units which approach within radio range thereof, whereby the general degree of synchronization of participating units tends to be improved. When considering the practicalities of air traffic with which the invention is particularly concerned, it is safe to assume that much of the air space will include a variety of aircraft ranging from those carrying relatively simple electronic equipment, to those carrying the most sophisticated equipment. Average conditions also include a wide variety of practical situations based both upon the distances of various aircraft from ground stations, for instance airports, weather ships, etc., and also upon the lengths of time since each aircraft last had its clock synchronized to a ground station. Although a large airliner may carry an atomic clock of such accuracy as to normally require no in-flight resynchronization from departure until it arrives at its destination, smaller aircraft carrying only crystal-oscillator clocks may require frequent resynchronization durnig their flights which may carry them far beyond radio contact with ground stations to which they might resynchronize.

It is therefore a principal object of this invention to provide a hierarchy system of air-to-air resynchronization, wherein each aircraft continuously estimates its own clock error, and during its own time slot telemeters this estimated clock error to all other aircraft within radio range. Then in other time slots it receives and notes the telemetered estimated errors of other aircraft clocks. Each aircraft, upon receiving estimated errors from other aircraft selects the one with the lowest estimated error and compares this error to its own estimated error. If the estimated error from the other aircraft is smaller than its own estimated error it may resynchronize its own clock to the clock in the selected aircraft.

It is another major object of this invention to provide a system by which an aircraft whose clock has become totally unsynchronized can resynchronize as soon as it is within radio range of another properly synchronized aircraft, thereby permitting the unsynchronized aircraft to safely re-enter the synchronized hierarchy. This capability is especially helpful to an aircraft taking off from a secondary airport and approaching air space having greater activity. Moreover, it provides a system in which non-commercial more modestly equipped aircraft can be safely flown in air space occupied also by commercial airliners.

It is another important object of this invention to provide an air-to-air resynchronization system which operates compatibly with various types of distance measuring and navigational equipment of general types which are well-known in the prior art and which serve to measure ranges between aircraft and ground stations, or between two aircraft, closing rate, altitude, altitude rate, etc. The present resynchronizing of the clocks can be accomplished by any one of a number of existing clock synchronizing techniques along the lines suggested in Minneman Patent 2,869,121; Graham Patent 3,183,504 or 3,255,900; Perkinson Patent 3,250,896; Michnik et al. Patent 3,336,591, etc., much of the equipment required in aircraft for ranging and collision avoidance also being useful in the resynchronization modes of the present invention.

Another important object of this invention is to provide a system in which an aircraft which is lower in the clock-accuracy hierarchy can select from a number of better-synchronized aircraft the particular aircraft having the smallest clock error, and then use the selected aircraft's clock to improve its own synchronization.

Still another major object of the invention is to provide means for determining and accumulating a continuous estimate of local clock error within each aircraft, the clock error in the present example being represented by a quantity stored in a digital register and accumulated by combining several input increments, respectively representing the normally-expected error introduced by the synchronization process itself and comprising a constant value including clock granularity, and a factor representing local clock error since the most recent synchronization based on the known drift rate for the type of clock carried in the aircraft multiplied by the elapsed time since resynchronization. The estimate of local clock error also includes another incremental factor, namely the "inherited" and remembered estimated clock error telemetered to the local aircraft from the aircraft with which synchronization was most recently performed. This inherited error is combined with the estimated synchronization error by the local aircraft to represent its initial clock error immediately after resynchronization. The combination of these various error increments in a root-sum-squared fashion is preferred to simple summation because of their statistical nature, but approximation by summation also provides a workable system having the advantage of greater circuit simplicity.

A further object of the invention is to provide a dual-mode system including a synchronization mode, and including a non-synchronization mode during which the system performs normal navigation, ranging, and collision avoidance functions, while concurrently accumulating and keeping track of its own clock error. During this latter mode the aircraft also continuously compares its accumulating clock error with estimated errors telemetered by other aircraft in the vicinity. When it encounters another aircraft whose estimated clock error is significantly less than its own, it then enters into a resynchronization mode, and perfroms resynchronization during successive time-slot epochs until its error has been reduced to that of the selected aircraft.

It is a further object of this invention to provide means for making a consistency check in which plural successive comparisons are made between on the one hand estimated clock errors including its own clock error and clock errors telemetered to it by one or more other aircraft, and on the other hand actual measured time errors (absolute), before determining that resynchronization should indeed be performed because of consistent indications that actual clock errors in fact approximate estimated clock errors in absolute magnitude.

A further object of this invention is to provide an alarm associated with means which accumulates the estimate of the local clock error, which alarm provides warning when the estimated local clock error exceeds a tolerable magnitude. Such an alarm warns the local aircraft not to be deceived by relying upon its own "one-way" range measurements to another aircraft, which measurements are based upon reference pulses transmitted by the other aircraft at "known" instants in the time slot sequence but which instants are determined by the time reading of the local clock which is inaccurate to the extent of relative synchronization errors between the two aircraft. In the present example estimated clock errors exceeding about 4 microseconds will actuate the alarm. An aircraft equipped with an atomic clock having a nominal frequency error of not more than two parts in $10^{11}$ will develop a 200 nanosecond error after about three hours, and therefore will have no more than a two microsecond error twenty-eight hours after synchronization. However, an aircraft equipped with a good crystal oscillator clock having a drift rate of three parts in $10^9$/day will develop an additional error of two microseconds in only three hours. A two microsecond error amounts to about 2,000 feet in a one-way range measurement. The above figures provide an idea of how often resynchronization will be needed.

Another object of this invention is to provide means for breaking a tie. Where two other aircraft have the same clock error, the present system will select for its own resynchronization the aircraft with the altitude closest to the local aircraft's.

Other objects and advantages of the present invention will become apparent during the following discussion of the drawings, wherein:

FIG. 2 is a timing diagram shownig an epoch of time slots sufficient to accommodate 1024 aircraft;

FIG. 3 is a timing diagram shownig the division of one time slot into intervals of time used for various functions;

FIG. 4 is a timing diagram showing the division of the telemetry portion of a single time slot to transmit the various required information; and FIG. 5 is a block diagram showing circuitry for obtaining the square root of the sum of the clock error increments squared.

Figure 1A:
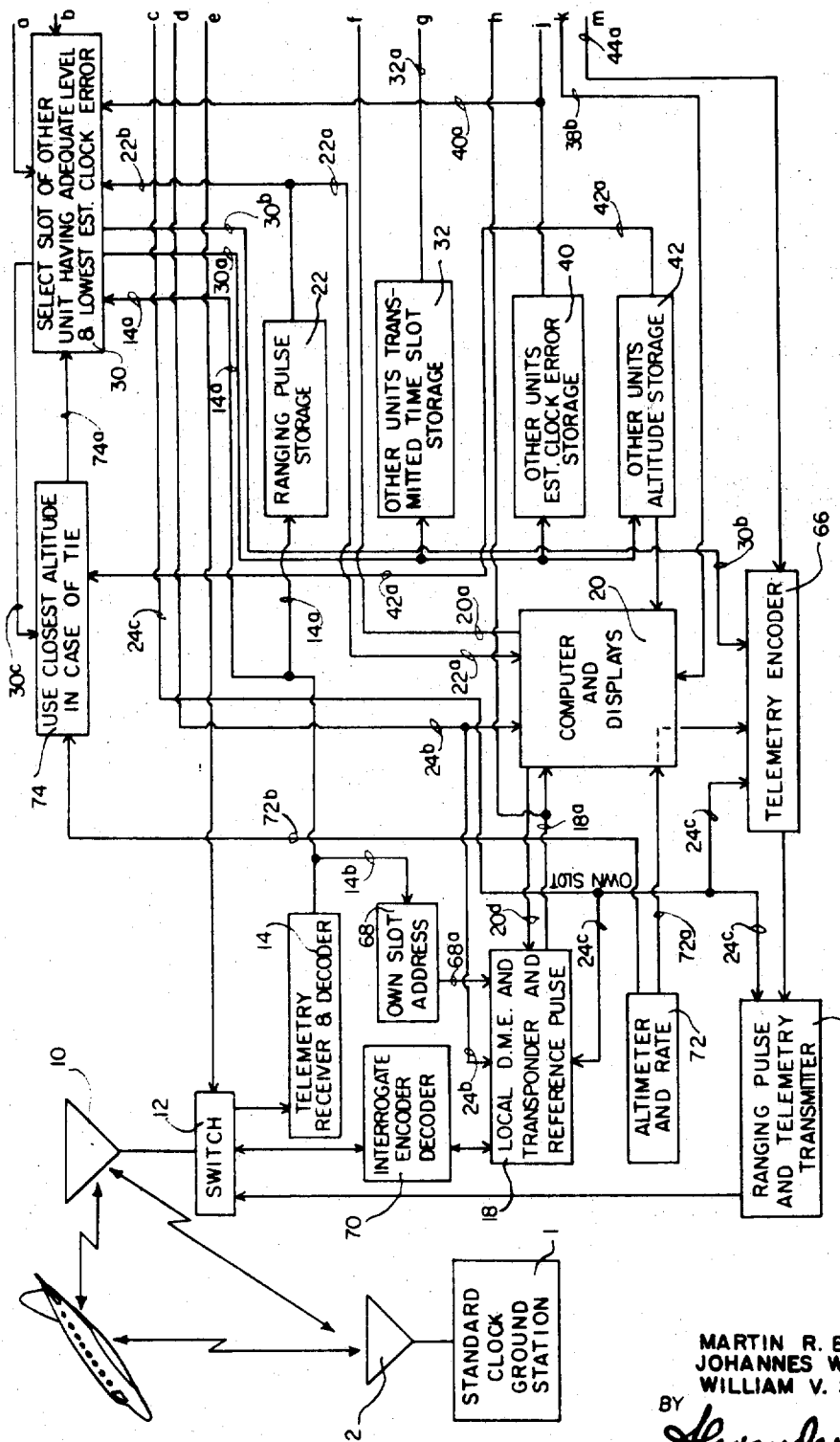
FIG. 1 is a block diagram showing an exemplary system including a ground station and an aircraft mobile station.

Referring now to FIG. 1, this figure shows a block 1 representing a ground station having an antenna 2 through which it can receive and transmit information relating both to the navigation of the local aircraft, and also to the synchronization of their clocks. The ground station 1 is assumed to have a local time clock which is exact and comprises a master clock for purposes of the present illustration. In a practical system plural ground stations would be mutually synchronized by means which form no part of the present invention. These stations are preferably distributed internationally around the world so that a worldwide standard time is established and continually maintained. As pointed out above, it is the object of this invention to continuously up-date the degree of synchronization of the time clocks in the aircraft unit so as to continually improve the time kept in the aircraft and make it more closely approach the world-wide time maintained by the mutually synchronized ground stations. FIG. 1 shows the block diagram of a typical aircraft system.

The aircraft involved are assumed at any one time to exhibit various degrees of accuracy of synchronization with respect to ground-station time. For example some aircraft will have more sophisticated clocks than others, i.e., commercial airliners flying closely synchronized atomic clocks, but light aircraft having only crystal oscillators. Moreover, the clocks in some aircraft will have been very recently synchronized, especially where they have just passed over an equipped ground station or have just departed from one, so that their clock errors will have been accumulating for only a brief flying time. Conversely, another aircraft may have been in the air for many hours without synchronization to a major ground station, or may have just taken to the air from an airport in which no synchronization facility was available. In the latter case its time clock is probably completely unsynchronized and therefore is on "local time."

The present hierarchy system is based upon the concept that an aircraft can estimate its own synchronization error in a manner which will enable it to determine the probability that its accuracy is better or poorer than the accuracy of another aircraft within radio range. In the first place, an aircraft "inherits" and remembers a certain initial error each time it synchronizes to another unit whose error it then adopts as a starting point. If it synchronizes to a ground unit, the inherited error will be nearly zero, but it will immediately begin accumulating other errors arising out of the process of synchronization and attributable to pulse rise-times and other delays in, and inaccuracies of the system, including clock granularity, all of which can be accurately estimated. Some errors are proportional to signal-to-noise ratio, and even better synchronization error estimates can be made if an AGC level factor is considered. Moreover, based on its own clock type, the aircraft can employ a factor representing the drift rate characteristic of its own clock type which it accumulates over the elapsed time since its most recent synchronization to determine an increment representing accumulated drift. Ideally the inherited error, the synchronization error, and the increasing time error due to clock frequency inaccuracy, should be combined as the square root of the sum of the squares. Various approximations can be employed also, such as simple summation. Each aircraft continuously accumulates these error increments to establish an over-all estimate of the error of its own time clock, and then telemeters its latest estimate to other aircraft during its own time slot. During other aircraft time slots it receives telemetered estimates of their clock errors, compares them with its own estimate, and makes a decision as to whether or not to synchronize to one of the other aircraft's time clocks. If it does so, it will adopt the other aircraft's estimate of error as its own initial error, will combine a synchronization error factor with it, and will then proceed to accumulate further error factors of its own based upon its own clock's drift rate over the elapsed time since synchronization.

FIG. 2 shows that each complete sequence of time slots, generally referred to in the art as a frame or as an epoch, includes a continuously repeating succession of time slots of identical length, FIG. 2 showing an example including 1024 time slots. The present invention assumes that each aircraft involved has acquired a unique time slot, either by pre-assignment before take-off from an airport, or by acquisition during flight, for instance in the manner discussed in Chisholm et al. Patent 3,161,869. The particular manner by which the time slots are acquired forms no part of the present invention.

FIG. 3 shows one particular time slot-sub-divided to provide a guard-space dead time of 250 microseconds at the beginning of the slot. At the end of this dead time, the unit occupying the slot transmits its own coded ranging pulse group R for indicating its range from all other equipped aircraft in synchronism with its time clock, each other aircraft receiving the ranging pulse group R and measuring the pulse transit time from that particular aircraft based upon knowledge of the moment of transmission and the moment of reception according to the receiving aircraft's clock. This technique is well-known in the prior art as a "one-way" range measurement, and requires no further elaboration. The time slot allows an interval of 625 microseconds after transmission of the ranging pulse R which is sufficient time to permit it to travel 100 nautical miles, which distance is assumed herein to be the maximum radio range of the illustrative system. Thereafter a 2300 microsecond interval is assigned in the time slot for telemetering local information to all other listening aircraft from the aircraft assigned to this particular slot.

FIG. 4 shows a satisfactory sequence for a 2300 microsecond telemetry interval, assuming, for example, pulse amplitude modulation with ¼ microsecond granularity. In view of the fact that transmitted pulses are apt to travel to other aircraft via several paths of different lengths, creating what is commonly referred to as the "multipath" problem, a plurality of 170 microsecond guard spaces are provided between the various telemetered information groups to allow time for multipath propagation to die out. The illustration of this diagram shows that in its own time slot each aircraft telemeters its own slot-identification, a guard space, the estimate of its own clock accuracy, a guard space, the address of the slot of another aircraft to which it is about to send an interrogate pulse, a guard space, its own altitude, a guard space, and the rate of change of its altitude, followed by another guard space. Each of the telemetered information pulse groups is permitted 256 μsec. for transmission, and the guard spaces are all 170 μsec. in duration according to the present scheme, although a more economical adjustment of the intervals of transmission can probably be made in a practical case.

Returning to the time slot shown in FIG. 3, after the data-telemetry interval of the unit's own slot is concluded, the unit transmits to the addressed aircraft an interrogate pulse group Q according to the present illustrative example. This pulse group is received and decoded by the transponder in the particular aircraft which was specifically addressed during the data transmission shown in the middle of FIG. 4. The interrogate pulse group Q and the transponder reply T from the queried aircraft are used by the local aircraft in the present example to determine actual range by the "two-way" method, which measures roundtrip pulse-travel time to provide very accurate range because the measurement is independent of the degree of synchronization of the aircraft. During the last 1950 microseconds of the time slot shown in FIG. 3 the aircraft awaits and receives both transponder reply pulses T and reference reply pulses F from the addressed aircraft, which information is used in the resynchronization mode of operation in a manner to be explained hereinafter.

Referring again to FIG. 1, each local mobile unit includes an antenna 10 connected by switching means 12 to one of several different transmitting and receiving devices. In every time slot except the aircraft's own, it is connected to a telemetry receiver 14, whereas in its own time slot it is connected to a telemetry transmitter 16. Moreover, in all time slots the antenna is connected to local distance measuring equipment 18 including also a transponder and reference pulse transmitter for replying to other unit's distance measuring equipment (D.M.E.). Each unit also includes computer and display equipment by which it can determine one-way ranges to other equipped aircraft, compute likelihood of collision, closing rate, etc., and display appropriate information to the pilot. The functions of this computer are of a general nature and only enter into the synchronization steps to the limited extent discussed below.

Assuming that the local unit us in reasonably good synchronization according to its own estimate, i.e., within ±250 μsecs. corresponding to initial dead space and terminal guard space, it will receive from other units the various telemetered data shown in FIG. 4, along with the other units' ranging pulses R as shown in FIG. 3. This information all passes through the telemetry receiver and decoder 14, and is delivered through wires 14a to various storage circuits including a ranging pulse R storage circuit 22 which delivers an output marking the instant of reception of the transmitting unit's ranging pulse R. The instant of ranging pulse arrival is delivered on wire 22a to the computer 20 which also receives a time indication on wire 24b indicating the instant reading of the local time clock.

This clock includes a counter chain 23 driving a time slot logic circuit 24, the counter being itself driven by an oscillator 26 and clock pulse circuit 28. This clock unit performs in a manner well known in the prior art, operating in the present illustration to divide a continuously repeating succession of epochs into local time slots, and to divide local time slots into intervals of one-quarter microsecond granularity. The pulse rate of the clock 26–28 is therefore 4 mHz., and this frequency can be provided for instance by an oscillator running at either a higher or lower rate and then divided or multiplied to deliver 4 mHz.

The reception by the computer of the instant of arrival of another unit's ranging pulse R on wire 22a, and the indication of local time arriving on wire 24b permits it to make a one-way determination of the travel time of the received ranging pulse R by which the computer generally determines range to the other unit. This usual ranging operation is performed in each of the successive time slots assigned to aircraft whose pulses are received at the local unit with adequate signal strength, and whose range is within the 100 miles arbitrarily selected for the present illustration. The determination of these ranges by the one-way technique is the normal function of the unit when it is not resynchronizing itself to a clock located within its range and having a lower estimated error. In the latter event, it also uses the D.M.E. unit 18 as will appear below.

The system shown in FIG. 1 performs two kinds of synchronization, namely coarse and fine, under certain conditions as follows:

Coarse synchronization

The coarse synchronization feature is especially useful for resynchronizing an aircraft which estimates itself to be completely out of synchronization, for instance reentering the synchronized time system after a long stopover at a remote airport having no synchronizing facility. The coarse synchronization will be necessary when time slots as telemetered by other aircraft do not agree with local time slot logic appearing on cable 24a. As pointed out in connection with FIG. 4, each unit telemeters the identity of the time slot which it occupies once per epoch, and this information is received through the local telemetry receiver and decoder 14, the wire 14a, a selection circuit 30 (described hereinafter), and the wire 30a. The telemetered slot number is then stored in a temporary time slot storage circuit 32 whose output is delivered on wire 32a to a slot comparator 34. This comparator 34 compares all received time slots as they are stored, but remains nonoperative so long as the received time slot designations from other aircraft agree with the locally determined instantaneous time slots appearing on cable 24a. However, when the comparisons made in the circuit 34 show disagreement, an output appears on wire 34a which actuates a correction circuit 36 which is programmed to accumulate enough mismatch indications during several epochs to be sure that a mismatch really exists. Then it delivers an output via cable 36a to the local time slot logic 24 causing it to correct its reading to match the telemetered and received time slot identity stored by the circuit 32. In order to increase the probability that an aircraft which is out of synchronism (on local time) will be able to promptly correct itself to match another synchronized clock, an output is also obtained from the local excessive clock error system 38 (to be described hereinafter), this output appearing on wire 38a and actuating the correction circuit 36 to perform coarse correction toward synchronization with less delay (fewer mismatch indications) when the estimate of local error is out of tolerance.

From the above, it can be seen that an aircraft which estimates itself to be out of synchronization and therefore on strictly local time can quickly correct itself to set its time slot logic into reasonable synchronization with other aircraft it is encountering. It is also to be noted that even if the local aircraft does not estimate itself to be out of synchronism, it can still perform resynchronism if its time slot consistency checks badly with sufficient frequency. It is not expected that coarse synchronization will take place more than once in any particular flight, except perhaps in the event of a momentary power failure. There are several ways of correcting the local counter, for instance, (1) by overriding the logic in unit 24 and seting into it other logic representing the telemetered time slot identity being stored by storage circuit 32, or (2) by speeding up the counter 23 beyond the normal pulse rate from unit 28 and maintaining this higher pulse rate until the comparator 34 shows time slot agreement. The prior art shows various other coarse synchronization clock-correction means adaptable to this system, but the details of the particular correction means selected form no part of the present invention.

Fine synchronization mode

Each time the local aircraft receives telemetered signals from another aircraft during time slots assigned to the latter, the local aircraft makes a comparison to determine whether its own estimate of clock error is greater or less than the estimated clock error telemetered to it from the transmitting aircraft. As pointed out above, these telemetered signals are locally received by a telemetry receiver and decoder 14 and are passed through a slot-selecting circuit 30 to the wire 30a, and are then delivered to storage means, 32, 40 and 42. One group of these telemetered signals, delivered to storage means 40, indicates the transmitting aircraft's estimated clock error which is then compared with the receiving aircraft's estimated local clock error to determine which error is greater.

The local aircraft has a register 44 in which it accumulates a quantity or count representing its own estimated clock error, this error comprising various input increments including (A) basic synchronization circuit delays and granularity; (B) the inherited error of the clock to which it most recently synchronized, the latter error being retained in the memory circuit 46 which received it from storage means 40 at the time of resynchronization; and (C) a local clock drift error increment which constantly increases from the instant of most recent resynchronization. The latter drift increment is provided by a circuit 48, which receives time counting signals from the local counter 23 on wire 23a and modifies these signals by a constant factor representing the theoretical drift rate of the local time clock. This circuit 48 may comprise a simple counter chain, or a periodically opened gate means which permits every $K^{th}$ pulse to pass to the register 44 on wire 48a to increase its accumulated error count. The output of the circuit 48 therefore represents the probable drift of the clock during the elapsed time since the most recent resynchronization. Whenever the accumulated error count in the register 44, including increments (A), (B) and (C) above, exceeds a predetermined permissible quantity, the "local time" circuit 38 is actuated and delivers an output on wires 38a and 38b, and actuates the alarm 39. The circuit 48, and the accumulating register 44, and the inherited error memory circuit 46 are all reset via the wire 47 at the beginning of each local clock resynchronization.

Although simple adddition of the various error increments may suffice to provide a count in register 44 representing the estimated local clock error, alternatively, a more accurate estimate can probably be obtained by taking the square root of the sum of the squares of the increments, since these increments are in fact independent random variables. The circuit shown in FIG. 5 would, for this purpose, replace the box 44 in FIG. 1. The circuit includes individual storage devices 80, 81, 82 and 83, for instance, analog integrators, whose inputs comprise the three increments (A) (B) and (C) mentioned above, plus a fourth one (D) taking into account the signal-to-noise ratio of the received pulse groups to compensate differences in rise times of pulses of different amplitudes. The stored values are then squared by suitable circuits 84, 85, 86, and 87; summed in the amplifier 88; and then the square root of the resulting value is extracted by a suitable square root circuit 89. The resulting output on wire 90 can be compared with a D.C. reference voltage in the circuit 38 to determine whether its value indicates an excessive estimated clock error.

Returning now to FIG. 1, during the fine synchronization mode, all measurements, calculations, and corrections must be completed in one time slot because of errors introduced by the relative movement of aircraft. A distance measurement in one epoch cannot be used in the next epoch because the distance between two aircraft will change by 1690 feet (assuming mutually approaching 500-knot aircraft) in an epoch lasting one second. If these data were used for a time correction in the next epoch, an approximate 1.7 γsec. error would be introduced.

One way to accomplish a correction toward synchronization during one time slot is to make a two-way range measurement during the synchronization interval of the slot, and then in addition use a synchronization reference pulse F, FIG. 3, transmitted by the interrogated aircraft at a known position in the same time slot as a marker against which a time-error determination can be made by the local aircraft receiving the reply. From the above data, the local aircraft computes the actual two-way range, and then checks the coincidence of the received synchronization reference pulse F with his own time clock reading offset by the travel-time delay of the pulse F, the local aircraft using one-half the two-way range transit time for this offset. The reference pulse F can be initiated by the interrogated aircraft's transponder and reference pulse circuit 18 when triggered by the wire 68a from the circuit 68 which recognizes its own slot address, and then initiates a pulse F, for instance at a fixed moment within the time slot in question as determined by its own clock whose time is indicated via the wire 24b.

Back in the interrogating aircraft, the interrogation was initiated by the wire 20d in conjunction with wire 24c, and when the interrogated aircraft's response is received, the wire 18a will provide the local computer 20 with times of arrival of the transponder pulse T and reference pulse F sent out by the replying synchronizer aircraft. The latter aircraft's encoder-decoder 70 will suitably and uniquely encode the pulses T and F as pulse groups so that the receiving aircraft can identify them with certainty. Only these actual error measurements as determined by the computer 20 can be used to determine the sign and magnitude of local clock corrections to be made, although the estimated clock error from register 44 is used as a factor in deciding whether fine synchronization should take place or not.

The computer 20 will determine the one-way range delay from the inputs of the local D.M.E. 18 (wire 18a). Moreover, it will deliver on wire 20a a signal indicating the position of the synchronization reference pulse F offset by the one-way range delay, and this latter signal will then be checked for coincidence with a local clock signal taken on wire 23b from the local time counter. The appropriately offset reference signal position on wire 20a is compared with the local time signal pulse on wire 23b by the error sign and magnitude circuit 60 which delivers an indication of their mutual positional error on wire 60a, as will be discussed below.

A telemetered signal representing the other aircraft's estimated clock error taken from the storage unit 40, and a signal representing an estimate of the local clock error taken from the register 44, are both delivered to a comparator 50 of estimated clock errors, FIG. 1. The output of the comparator 50 on wire 50a is delivered to a consistency checker device 52 which compares the absolute value of the actual measured error from circuit 60 with the sum of the estimated local and received clock errors. If the consistency checker 52 determines that the error is not consistent over several epochs, then the interrogated aircraft is rejected by output on wire 52b to the selection circuit 30, and another aircraft is selected, having a similar position in the hierarchy as determined from estimates arriving on the wire 20a at the selection 30. If after repeating the consistency check a few times perhaps even with different synchronizers, the inconsistency persists, then the alarm 54 will be actuated to alert the pilot that the system is failing. The slot selection circuit 30 also delivers an output on wire 30c to actuate circuit 74 to help select another synchronizer aircraft to synchronize to in case of a tie, the selection favoring aircraft closest to the local aircraft in altitude.

On the other hand, if the comparison of errors is consistent and is above a certain threshold magnitude, then a "yes" output signal appears on the wire 52a to operate the decision to synchronize circuit 56. When the compared clock errors are such as to require no synchronization, no output appears on the wires 52a, but when the error is great enough to make resynchronization desirable, and has passed the consistency check made by the circuit 52, an output appears on wire 56a to enable the early/late circuit 58. Wire 38a carries a control signal that enables the decision to synchronize circuit 56 to require fewer consistency checks when the unit's clock is on local time, thereby achieving fine synchronization sooner. The ranges to other units are always measured, even though the pilot is warned not to rely upon them if the alarm 39 is actuated to show that local clock error is excessive. Alternatively, an output on wire 38b can be used to gate off the displays 20 of the computer whenever an excessive clock error is estimated.

During fine synchronization, the time error circuit 60 delivers an output on wire 60a representing a magnitude and polarity which drives the early/late circuit 58 when it has been enabled by an output from the decision to synchronize circuit 56 on wire 56a. The output of the early/late circuit 58 on wire 58a drives two adjustment circuits. One of these is an oscillator phase/frequency adjustment circuit 62 which makes small incremental phase or frequency corrections as needed. For atomic clocks no frequency adjustment is necessary, but it may be desirable to include frequency adjustment means to compensate for aging of a quartz-crystal oscillator. When consistent phase adjustments are required, it can be assumed that the local clock has a frequency offset that makes it run at a faster or slower rate than normal. By accumulating phase corrections over a period of time, a small frequency change can be made which will reduce the number of subsequent corrections required. The phase adjustment portion of the phase/frequency adjustment circuit 62 is to provide a step analog change in phase of the output from the oscillator when it is required. Wire 85b can perform a similar corrective function by digitally operating upon the clock pulse circuit 28, for instance to omit output pulses on wire 28a when the clock is running early. Suitable clock oscillator adjustment techniques are well-known in the prior art, and their details are not considered inventive in the presently illustrative system.

Returning now to the distance measuring equipment 18 within the local aircraft, once the determination has been made to synchronize to a particular aircraft selected by the circuit 30, an output will appear on the wire 30b indicating the selected time slot of the selected aircraft, and this information is stored in the telemetry encoder 66 and will be telemetered during the local aircraft's assigned slot, i.e., during the center portion of the telemetry sequence shown in FIG. 4, thereby indicating to the selected aircraft that it is about to be interrogated by the local aircraft. Within the selected aircraft this information appears on wire 14b and enables its own slot-address circuit 68, which in turn enables the local transponder to reply when interrogated by a Q pulse from the aircraft desiring synchronization.

Back in the local aircraft, when its own time slot occurs, wire 24c, after addressing the selected aircraft it sends out the above-mentioned interrogate pulse Q, as shown in FIG. 3, which pulse is later decoded in the interrogate encoder-decoder circuit 70 of the selected remote aircraft, thereby causing the remote transponder 18 to reply without delay to the local aircraft with a transponder reply pulse T so that the latter using its own computer 20 can deliver a true indication of range as determined by the roundtrip two-way method. The interrogated aircraft also sends back its reply reference pulse F at a fixed point in the time slot of the interrogating aircraft, and as a result the local computer 20 then receives signals on wire 18a from which it can determine actual-range pulse transit time. Knowing this transit time it can compute the difference (error) between time according to the local clock, and the time of transmission of the reference pulse F according to the interrogated aircraft's clock.

Each unit also includes an altimeter 72 which measures its own altitude and rate of change thereof, and supplies this information through wire 72a via the encoder 66 to the telemetry transmitter 16. The identity of the unit's own slot is sent to the encoder 66 on wire 24c, and the estimate of the local clock error is delivered on wire 44a from the digital register 44 to the encoder 66. The telemetry transmitter 16 and the local D.M.E. 18 are also both enabled by output appearing on wire 24c, indicating the unit's own time slot.

The altimeter 72 and the storage circuit 42 showing the altitude of the other aircraft have outputs 42a and 72b delivered to comparison circuit 74 whch compares these altitudes and in turn provides an output on wire 74a influencing the slot selector circuit 30 to select for synchronizing an aircraft flying at an altitude close to the local aircraft's altitude in the event that several aircraft having like degrees of clock accuracy are within range.

Having illustrated the present invention by describing an embodiment thereof as shown in the drawings, we claim as follows:

1. In a mobile unit navigation system of the type performing range measuring by the exchange of signals between mobile and/or stationary units having time clocks synchronized to a time standard and the units establishing a hierarchy according to the degrees of accuracy with which they are respectively synchronized, means in the units for improving their respective degree of synchronism in the hierarchy comprising:
   (a) means in each unit for determining an estimate of the degree of accuracy of synchronization of its local clock;
   (b) means in the units for communicating the estimate of local clock accuracy to other units;
   (c) means in each unit for comparing its local-clock accuracy estimate with estimates received from other units and for selecting another unit estimating a higher degree of clock accuracy;
   (d) signal-exchange means in the units for determining actual time offset of the clock in the local unit with respect to the clock in a selected unit; and
   (e) means for correcting the clock in the local unit to reduce said offset.

2. In a system as set forth in claim 1, said means for determining an estimate of accuracy comprising means for accumulating error increments to obtain a quantity representing the latest estimate; means for resetting said accumulating means when the local clock is synchronized to the clock in a selected unit; and means for entering into the local accumulating means clock error increments including an initial increment representing the estimated error of the unit synchronized to, and including increments based on estimated local clock drift during the time elapsing since the most recent clock synchronization.

3. In a system as set forth in claim 2, means for entering a further increment of error into said accumulating means representing inaccuracies of synchronization involving determination of said offset and correction of the local clock to reduce the offset.

4. In a system as set forth in claim 3, said signal-exchange means including the exchange of pulses between the units, means for determining the received amplitude level of the pulses exchanged, and means for entering in said accumulating means an increment compensating for pulse rise times and based upon said amplitude level.

5. In a system as set forth in claim 2, said means for entering error increments including means for squaring each increment; means for obtaining the sum of the squared increments; and means for taking the square root of said sum to determine the local estimate of accuracy.

6. In a system as set forth in claim 2, alarm means operatively connected with said accumulating means and responsive to the accumulating of a quantity exceeding a predetermined level to warn of excessive local clock error.

7. In a system as set forth in claim 1, said means for selecting another unit estimating higher clock accuracy, including means for favoring selection of a unit communicating the estimate of greatest accuracy; and means for favoring selection of a unit whose received signal is at a reliable level.

8. In a system as set forth in claim 7, said units comprising aircraft, and including means for communicating their respective altitudes to each other, and said selecting means including means for favoring selection of a unit whose altitude most closely approximates that of the unit making the selection.

9. In a system as set forth in claim 1, said time standard being divided into repeating epochs, each including plural time slots uniquely occupied by the several units, and each communicating means having means operative during the unit's own slot to transmit data including its estimate of local clock accuracy and the identity of the slot which it occupies.

10. In a system as set forth in claim 9, each unit having means for receiving said transmitted data, and having means for comparing the slot identity being transmitted with the slot indication made by its local time clock; and means for correcting the local time clock to match the time slots identified by received data.

11. In a system as set forth in claim 10, each unit having means operatively connected with said means for determining said estimate of accuracy, and responsive to an estimate of excessive local error to enable said local time clock correcting means to respond to an indication of mismatch in the time slots.

12. In a system as set forth in claim 9, each unit having means for making a local decision whether to synchronize to another unit whose received estimate of clock accuracy is favorable, and said system including means operatively connected with means for determining said estimate of accuracy and responsive to an estimate of excessive local error to deliver an output to said decision means favoring synchronization.

13. In a system as set forth in claim 12, means for comparing the local estimate of clock accuracy with estimates of clock accuracy transmitted by other units, and for delivering an output to said decision means favoring synchronization whenever the local estimate of accuracy consistently checks unfavorably with estimates communicated by other units.

14. In a system as set forth in claim 12, said signal-exchange means in each unit including first means for accurately measuring ranges to other units independent of local clock synchronization, and including second means for measuring ranges to other units the accuracies of which measurements are dependent upon the degree of mutual clock synchronization between units; and means for comparing ranges measured by said first and second means and delivering an output to said decision means favoring synchronization when said measured ranges consistently fail to agree.

15. In a system as set forth in claim 12, consistency checking means connected to said decision to synchronize means; and alarm means connected to said consistency checking means and operative to warn of inconsistent input to the decision means.

16. In a system as set forth in claim 12, said signal-exchange means in each unit including first means for accurately measuring signal propagation time to another unit independent of mutual clock synchronization, and including second means for measuring signal propagation time to said another unit wherein the accuracy of measurement is dependent upon the degree of mutual clock synchronization; means for comparing said propagation times and determining therefrom information representing the sign and magnitude of offset error in mutual clock synchronization and for delivering said information to said correcting means.

17. In a system as set forth in claim 16, each unit having means for receiving said transmitted data from other units and for selecting another unit to which to synchronize; said first measuring means comprising means in the former unit operative during its own time slot to transmit the identity of the selected unit and to transmit an interrogate signal, and comprising means in the selected unit responsive to the interrogate signal and to its own slot identity to respond with a transponder reply, and further comprising means in the former unit for receiving the reply and measuring the time elapsed since the interrogate transmission according to its own clock.

18. In a system as set forth in claim 16, said second measuring means in each unit comprising means for transmitting a ranging pulse during the time slot it occupies at a predetermined instant therein as determined by its local clock, and other units having means for receiving said rainging pulse and determining its propagation time delay according to their own clocks.

References Cited

UNITED STATES PATENTS 3,336,591  8/1967  Michnik et al. _____ 343—7.5 X
3,388,393  6/1968  Graham et al. _____ 343—7.5

RODNEY D. BENNETT, *Primary Examiner.*

T. H. TUBBESING, *Assistant Examiner.*

U.S. Cl. X.R.

343—6.5